United States Patent [19]
Chao

[11] Patent Number: 4,747,986
[45] Date of Patent: May 31, 1988

[54] DIE AND METHOD FOR FORMING HONEYCOMB STRUCTURES

[75] Inventor: Tai-Hsiang Chao, Mt. Prospect, Ill.

[73] Assignee: Allied-Signal Inc., Morristown, N.J.

[21] Appl. No.: 946,234

[22] Filed: Dec. 24, 1986

[51] Int. Cl.$^4$ ............................................. B29C 47/12
[52] U.S. Cl. ........................... 264/177.11; 264/177.12; 264/209.8; 425/198; 425/461; 425/464
[58] Field of Search ........... 264/177.12, 209.8, 177.16, 264/177.11; 425/380, 461–467, 197–199

[56] References Cited

U.S. PATENT DOCUMENTS

| | | | |
|---|---|---|---|
| 2,908,037 | 10/1959 | Harkenrider | 425/199 |
| 3,038,201 | 6/1962 | Harkenrider | 425/197 |
| 3,406,435 | 10/1968 | Dietzsch | 425/198 |
| 3,790,654 | 2/1974 | Bagley | 264/177 |
| 3,824,196 | 7/1974 | Benbow et al. | 252/455 R |
| 3,905,743 | 9/1975 | Bagley | 425/464 |
| 3,983,283 | 9/1976 | Bagley | 264/177.12 |
| 4,178,145 | 12/1979 | Hamamoto et al. | 425/199 |
| 4,242,075 | 12/1980 | Higuchi et al. | 264/209.8 |
| 4,259,057 | 3/1981 | Abe et al. | 425/463 |
| 4,298,564 | 11/1981 | Higuchi et al. | 264/177.12 |
| 4,343,604 | 8/1982 | Minjolle | 264/177.16 |
| 4,468,366 | 8/1984 | Socha, Jr. | 425/198 |
| 4,550,005 | 10/1985 | Kato | 264/177 |

Primary Examiner—Jeffery Thurlow
Attorney, Agent, or Firm—Thomas K. McBride; John F. Spears, Jr.; John G. Tolomei

[57] ABSTRACT

An extrusion die for producing multichanneled structures from an extrudable material. The die is composed of a series of pins that correspond to the shape of the channels in the structure. At one end of the pins, the area between the pins is open to define a discharge zone having the shape of the structure. At their opposite ends, the pins are connected about adjacent corners by a series of webs. Slots bordered by the pins and the webs define a series of feed passages that communicate with the discharge zone at areas of reduced width between adjacent pins.

6 Claims, 1 Drawing Sheet

DIE AND METHOD FOR FORMING HONEYCOMB STRUCTURES

BACKGROUND OF THE INVENTION

1. Field of the Invention

This invention relates generally to honeycomb structures formed of ceramic materials. More specifically, this invention relates to the forming of ceramic materials into thin wall honeycomb structures by extrusion.

2. Description of the Prior Art

The term honeycomb structures is used generally to describe a thin walled body having a series of regularly or irregularly shaped parallel channels that extend continuously over the length of the body and are separated by wall elements that give the body its structure. The cross-section of each channel may vary from channel to channel but usually will have a regular geometric shape. These honeycomb structures find use in regenerators, heat exchange equipment, filters, and as catalyst carriers. The use of such carriers is also well known in the treatment of automotive exhaust gases where the carriers are typically treated with a wash coat of catalytic material.

Ceramic honeycombs have been formed by extrusion methods with fairly good success. The extrusion method uses a hydraulic ram to push the extrudable material into a series of feed passages which communicate with a discharge area. The discharge area has a series of projections that displace the extrudable material from the sections that will eventually correspond to the channels and define a series of gaps which shape the extrudable material into the walls of the honeycomb structure. It has become common practice to extrude honeycombs having channel densities of from 100 to 200 channels per square inch upon extrusion, and 200 to 400 channels per square inch after shrinkage of the extrudable material during curing. Typically the wall thicknesses between the channels of the honeycomb structure will vary between 0.002 inches and 0.050 inches.

Methods and apparatus for forming extruded honeycomb structures are further described in U.S. Pat. Nos. 3,790,654, 3,905,743, 3,824,196 and 4,550,005.

U.S. Pat. Nos. 3,905,743 and 3,790,654 issued to Bagley describe a method for forming a thin walled honeycomb extrusion that uses a die having feed passages and intersecting feed slots. Bagley claims and primarily teaches aligning the feed passages to communicate directly with the interconnections or intersections between a series of orthogonal slots. U.S. Pat. No. 3,824,196 issued to Benbow et al., describes a method of making a thin walled honeycomb structure by passing a plastic material through a die having a series of feed passages that again intersect and communicate directly with intersecting points in a series of orthogonal slots that define the shape of the extrusion. Benbow also teaches that the feed passages should have a greater cross-sectional area than the transverse cross-sectional area of the discharge slots in order to provide sufficient material for filing the discharge slots.

U.S. Pat. No. 4,550,005 issued to Kato teaches a method of extruding a honeycomb structure having walls of varied thickness and a die for use therein. The die and the method of Kato use feed passages having a hydraulic diameter that varies in relation to the walled portion being formed thereby. The feed passages are varied such that feed passageways associated with a thin walled portion have a relatively large hydraulic diameter, and feed passageways associated with thick wall portions have a relatively small hydraulic diameter.

As the above prior art demonstrates it has been believed that it is necessary to provide feed passages with a greater cross-sectional area than that of the discharge slots over the die in general or at least in areas where the discharge slots have a low hydraulic diameter. In addition, the tendency to directly feed plastic material into the most open section of the discharge passages and rely on lateral flow to fill more narrow sections forces remixing and mechanical reworking of the material to occur over a region of reduced cross-section. Therefore methods for extruding honeycomb structures have not been arranged to maximize the strength of the honeycomb structure. Furthermore, providing additional area for the feed slots and locating and aligning the feed slots to maximize flow into the discharge slots, has complicated the design and fabrication of dies and led to die designs that have less than optimal structural integrity.

SUMMARY OF THE INVENTION

It is an object of this invention to provide an improved method and die for producing extruded honeycomb structures.

It is another object of this invention to provide a die and method for increasing the structural integrity of honeycomb structures.

It is also an object of this invention to provide a die having improved pin strength.

It is a further object of this invention to provide an easily designed die for extruding honeycomb structures.

In one aspect the instant invention is directed to an extrusion die for extruding honeycomb structures from an extrudable material. The die has a solid body and a plurality of parallel pins that are defined by the body and correspond to the shape of the channels in the honeycomb. A discharge zone is defined by the open space between the pins and corresponds to the cross-sectional shape of the honeycomb. The discharge zone has regions of reduced transverse width between the pins. A plurality of feed passages communicate directly with the discharge area through the regions of reduced transverse width. The extrudable mixture is passed through the feed passages and directly into the regions of reduced width so that only those regions of the die having the smallest hydraulic diameters are the first to be filled with the extrudable material.

Feeding the extrudable material first to the minimum hydraulic diameter sections of the die assures that this section of the die is completely filled to the maximum density, thereby improving the structural strength of the final honeycomb structure and maximizing the quality of the wall sections where they are the thinnest and potentially the weakest. Since the thinnest wall sections have the smallest hydraulic diameters and thus the greatest resistance to flow, lateral movement of the extrudable mixtures into adjacent areas of the die is encouraged as the mixture will seek the easiest flow path. As a result, it may be possible to reduce the overall length of the die since the distance over which flow impedance is necessary for distribution is decreased by maximizing lateral movement of the extrudable mixture.

In a more specific form, the extrusion die of this invention has a plurality of intersecting discharge slots that are defined by the die body. The intersecting discharge slots are in communication with the feed passages which have a cross-section that substantially matches the cross-section of the nonintersecting portion of the discharge slots. The feed passages are segmented by die body material that remains between the pins and acts as structural webs to interconnect the pins. In this form the design of the feed slot opening is consistent with the geometry of the discharge slots and that portion of the die base material left between the segmented feed passages connect the pins to form the die. In addition, the metal webs increase the structural strength of the pins since they connect the pins at their outermost points.

In another aspect this invention is directed to a method of extruding honeycomb structures from an extrudable material. The method comprises pressing an extrudable material through a plurality of feed passages and feeding the extrudable material from the feed passages into a discharge zone. The discharge zone has a plurality of parallel pins that define the shape of the channels in the honeycomb. The extrudable material enters the discharge zone at points of minimum clearance between adjacent pins which have relatively higher flow resistance. The flow of extrudable material is impeded through the discharge zone so that the extrudable material flows laterally and fills the entire discharge area cross-section. Extrudable material then flows out of the discharge zone in the form of a honeycomb structure.

In a highly desired form, the pins in the discharge area define a series of intersecting slots. The feed material enters these slots at points intermediate the intersection of the slots. Other objects, aspects and details of this invention will become apparent from the following detailed description.

DETAILED DESCRIPTION OF THE PREFERRED EMBODIMENT

Figure 1:
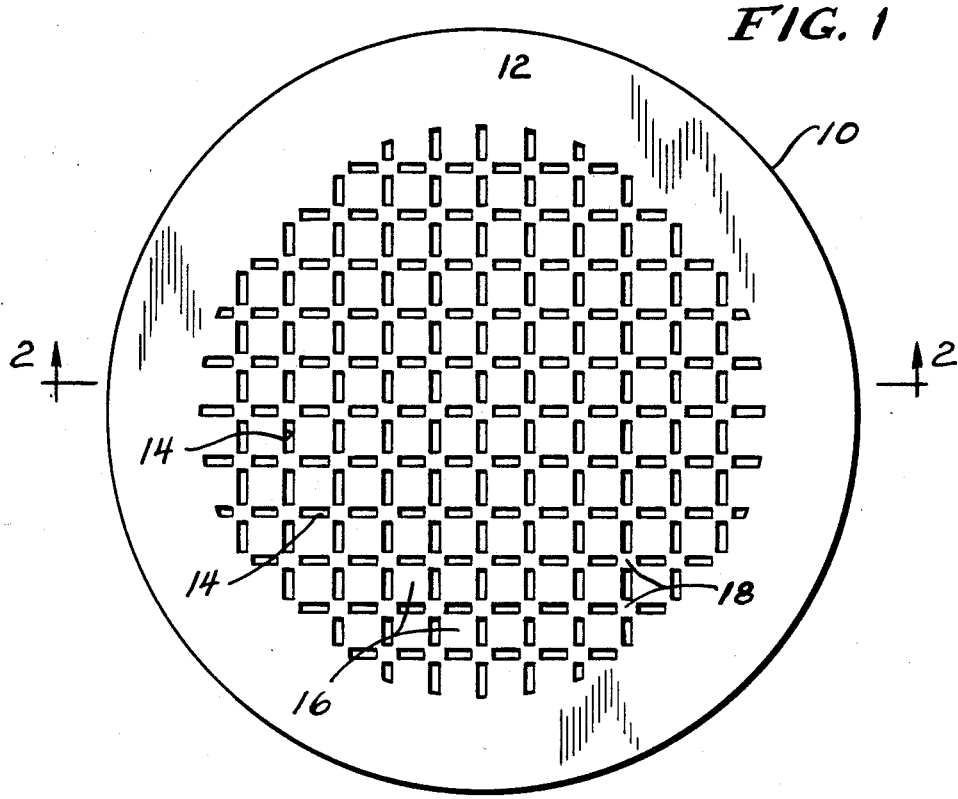
FIG. 1 is a plan view showing the inlet side, or top, of a die of this invention.

Referring then to FIG. 1, this view depicts an extrusion die body 10 having a top or inlet surface 12. In the center of the inlet surface a series of segmented slots 14 are equally spaced across inlet surface in two directions and orthogonally arranged. The slots define a gridwork of square pins 16 which are bordered on four sides by the major length dimensions of the slots. The slots are segmented and bordered on their minor dimensions by a smaller rectangular web piece 18 which connects the corners of adjacent pins 16. The web sections 18 are slightly wider than segmented slots 14. This additional width provides the necessary overlap to secure channel pins 16 to the web sections. The web and pin overlap usually extend for 5 to 20% of the maximum length of slots 14. While increasing the overlap will reduce the length of the slot, it only removes slot length at the end of the slot. Reducing slot length at the ends of the slots coincides with the objective of this invention to provide extrudable material at the region of smallest hydraulic diameter. Thus, the web section arrangement leaves the most desired area open for feed introduction. A feed batch of extrudable material for forming the honeycomb structure enters segmented slots 14 which serve as the feed passages formed of the die.

Figure 2:
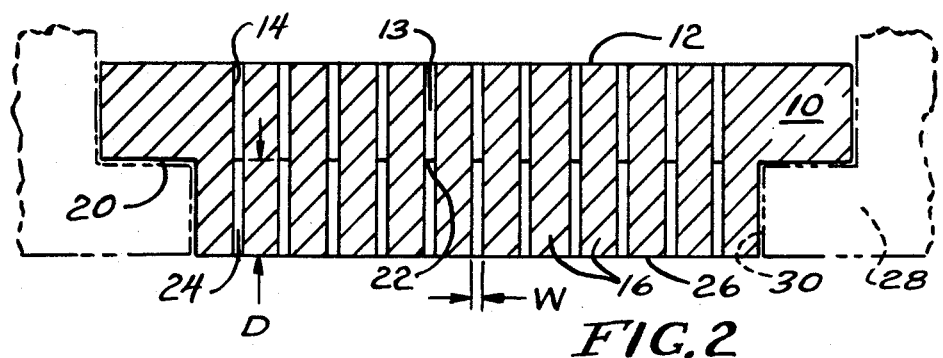
FIG. 2 shows a section of the die taken across line 2—2 of FIG. 1.

The interior of the die is shown more fully in FIG. 2 which is a section that cuts perpendicularly across a row of pins 16. Any given quantity of the extrudable material that enters the center of the die first flows through segmented slot portion 14. The segmented portions of slot 14 extend downward to the level of a shoulder 20 which is used to mount the die in the hereinafter described jaws of a feed press. Thus, the bottom section of the feed passages formed by segmeted slots 14 terminate at the lower surface 22 of web sections 18 which define the segments. Below the lower surface 22 of web sections 18 segmented slots 14 coincide with the nonintersecting portions of a series of intersecting slots 24. The cross-section of the intersecting slots 24, taken across a plane transverse to the principle axis of pins 16, forms what is more generally referred to as the discharge area. In the case of an orthogonal gridwork, as defined by square pins, flow impedance is proportional to the effective width across the slots 24. This effective width varies relative to the nonintersecting portion of the slots where it can be represented as W and the slot intersections where for a 90° intersection, it then equals W/cos 45°. Accordingly, the nonintersecting portions of slots 24 present regions of reduced width between the pins which in turn increases the flow resistance in these regions. Thus, with the removal of web sections 18, intersecting slots 24 have a lower resistance to flow than segmented slots 14 due to the additional area at the slot intersections and the greater effective width of this area. In this regard, segmented slots 14, or more generally the feed passages, will usually have 1.2 to 4 times the flow resistance of intersecting slot 24 or the discharge slots. As extrudable material flows down through slots 14 it enters intersecting slots 24. The intersecting slots have a depth D which is sufficient to allow the extrudable material to flow laterally and completely fill intersecting portions of the slot which do not directly communicate with segmented slots 14. Although the required depth D will vary with the viscosity of the extrudable material, due to the arrangement of this invention which introduces the feed material into the nonintersecting portions of the slot, depth D may be reduced since lateral flow is encouraged by the higher flow impedance offered by the nonintersecting portions of intersecting slots 24. After the feed material has assumed the form of the honeycombs as defined by the intersecting slots 24, it is discharged from the die through outlet surface 26. During the extrusion process the die remains positioned in a set of jaws 28 which form part of an extrusion press (not shown). Sidewall portion 30 of jaws 28 fits closely against outer pins 16 to prevent the loss of extrudable material from the sides of slots 24.

FIG. 2 also clarifies the channel pin and web section arrangement and interconnections. As shown, channel pins 16 extend from inlet surface 12 to outlet surface 26. The channel pins 16 are interconnected to adjacent corners of the web sections 18 from the top surface 12 to the level of shoulder 20. Hence the height of inlet surface 12 above shoulder 20 can be varied to increase or decrease the interconnecting length between the pins and web sections. By simply increasing the interconnecting length, the overall strength of the die can be increased to withstand forming pressures exerted on top surface 12.

Figure 3:
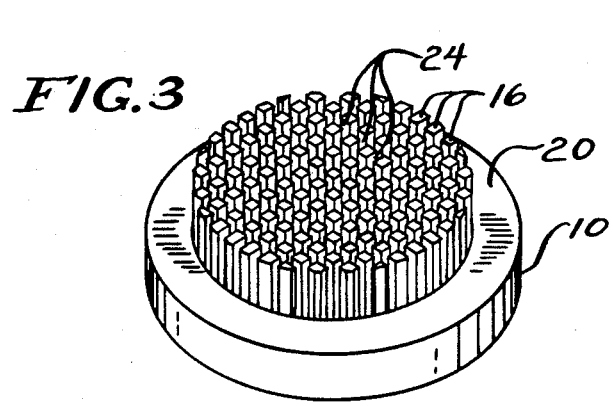
FIG. 3 is an isometric view of the discharge side, or bottom, of the die.

The arrangement of outlet slots 24 and channel pins 16 is shown more fully in FIG. 3. The outer ring of channel pins 16 have irregular shapes that define a generally circular shape. This circular shape allows sidewall portion 30 to close the sides of slot 24. In the discharge section where the web sections are absent, the outlet surface presents a regular gridwork of channel pins 16 wherein each pin is surrounded by intersecting slots 24.

FIGS. 1 and 3 show the segmented and intersecting slots arranged to provide square channel pins. However, these slots may be arranged to provide any number of geometric patterns such as triangles, circles, rectangles, etc. Flat sided geometric patterns are particularly preferred since the slot intersections are definitely defined and occupied in the inlet portion of the die by web sections.

The die is preferably made from a solid block of material. The segmented slots and intersecting slots may be formed by removing the base material of the die from the solid blocks through appropriate techniques. It has been found that in order to make very fine honeycombs, having 200 channels per inch or more, the necessary tolerance and uniformity can be easily achieved by electric discharge machining. It is also contemplated that laser cutting techniques can be advantageously employed to machine the die.

A variety of materials can be used for forming the die. The only requirements are that the material can be formed or machined into the shape of the desired die and will have sufficient strength to withstand the pressure exerted on the die during the extrusion process. A preferred material for the die is cold rolled steel. An advantage of employing burning methods, such as electric discharge machining or laser cutting techniques, to machine the die from cold rolled steel, is that the die's stock may be hardened prior to the machining process.

EXAMPLE

In order to obtain honeycomb structures by the method of this invention, using a die is hereinbefore described, an extrusion die was prepared. The die has an overall diameter of approxiaately 1⅜ inches and an overall thickness of ½ inch. The discharge portion of the die was machined to approximately 1 3/16 inch diameter to provide a 3/16 inch shoulder about the circumference of the inlet portion of the die. Electric discharge machining was employed to form 1/16 inch by 1/40 inch segmented slots and square pins approximately 0.075 inch in diameter. This pattern yields a channel density of 100 openings per square inch. The thickness of the die was divided about evenly into intersecting slots and segmented slots of feed passages such that each type of slot has a total depth of approximately ¼ inch. For this die the segmented slots have about 4 times the resistance to flow as that of the intersecting slots for the hereinafter described feed mixture.

An extrudable material comprising 43 parts of kaolin clay, 39 parts of talc powder, 18 parts of alumina, 31 parts of water and 4 parts of methocel as lubricant were mixed by a paddle mixer to provide an extrudable mixture. This mixture was introduced into the cylinder of an extrusion apparatus containing the previously described die. A hydraulic piston produced a pressure of about 2,000 psi on the extrudable mixture which forced the mixture through the die at a rate of approximately 30 inches per minute. An extrusion recovered from the bottom of the apparatus was found to have well-formed walls between the channel openings having a thickness of about 0.025 inches. The overall honeycomb structure had approximately 100 openings per square inch. The ceramic honeycomb structure was then dried and fired to approximately 1435° C. which reduced the thickness of the channel walls to approximately 0.020 inches and increased the number of channels to approximately 160 openings per square inch.

Although this invention has been described primarily in the context of a single preferred embodiment, this is not intended to limit this invention to the specific details or method associated therewith.

What is claimed is:

1. An extrusion die for producing multichanneled honeycomb structures from an extrudable material, said die comprising:
   (a) a die body having a plurality of polygonally shaped pins in a spaced apart arrangement wherein all of said pins extend over the length of the die and have mutually perpendicular major axes and parallel surfaces between adjacent pins;
   (b) at least two intersecting slots defined by first ends of said pins;
   (c) a web section interconnecting second ends of said pins about each nontransverse corner of each pin; and
   (d) feed passage between every two adjacent web sections, defined by the second ends of said pins and said web sections, all of said passages only communicating directly with, and together having a configuration that substantially matches the configuration of, the nonintersecting portion of said slots.

2. The extrusion die of claim 1 wherein said slots have a uniform width and comprise at least two sets of parallel channels.

3. The die of claim 2 wherein said channels are orthogonal.

4. A method of forming a multichanneled honeycomb structure from an extrudable material, said method comprising:
   (a) pressing said extrudable material through a plurality of feed passageways;
   (b) feeding said extrudable material from said feed passages into a discharge zone having a plurality of parallel pins for defining at least two sets of intersecting discharge slots and the shape of the channels in said multichanneled honeycomb wherein, said extrudable material first enters said discharge zone at every nonintersecting portion of said discharge slots;
   (c) impeding the flow of said mixture through said discharge zone in a direction parallel to said pins such that said material fills the entire discharge zone; and
   (d) discharging said multichanneled honeycomb structure from said discharge zone.

5. The method of claim 4 wherein the feed passages have a combined cross-sectional area less than the transverse cross-sectional area of the discharge zone.

6. The die of claim 1 wherein the distance between adjacent webs is at least 60% of the distance between the corners of the pin that is contacted by said adjacent webs.

* * * * *